(12) United States Patent
Nishii et al.

(10) Patent No.: US 9,407,195 B2
(45) Date of Patent: Aug. 2, 2016

(54) POWER TOOL (71) Applicant: Panasonic Corporation, Osaka (JP)

(72) Inventors: Kazuhiko Nishii, Shiga (JP); Hidezumi Okamura, Mie (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 13/873,435

(22) Filed: Apr. 30, 2013

(65) Prior Publication Data

US 2013/0300331 A1   Nov. 14, 2013

(30) Foreign Application Priority Data

May 10, 2012  (JP) ................................ 2012-108540

(51) Int. Cl.
| | |
|---|---|
| *H02P 7/00* | (2016.01) |
| *H02P 3/22* | (2006.01) |
| *H02K 7/14* | (2006.01) |
| *H02P 29/00* | (2016.01) |
| *B25F 5/00* | (2006.01) |

(52) U.S. Cl.
CPC ............ *H02P 29/0088* (2013.01); *B25F 5/008* (2013.01)

(58) Field of Classification Search
CPC .............. H02P 29/0088; H02P 7/0044; H05K 7/20209
USPC ..................................... 318/379, 471; 310/50
See application file for complete search history.

(56) References Cited

U.S. PATENT DOCUMENTS

| | | | |
|---|---|---|---|
| 2002/0182020 A1 | 12/2002 | Oomori et al. | |
| 2005/0219785 A1 | 10/2005 | Gorti et al. | |
| 2006/0180327 A1 | 8/2006 | Nagasaka et al. | |
| 2009/0272242 A1 | 11/2009 | Okada et al. | |
| 2011/0180286 A1 | 7/2011 | Oomori et al. | |
| 2011/0227430 A1* | 9/2011 | Omori ....................... | B25F 5/00 310/50 |
| 2012/0019177 A1* | 1/2012 | Kaufmann .............. | B25F 5/001 318/379 |
| 2012/0074883 A1 | 3/2012 | Okada et al. | |
| 2012/0100405 A1* | 4/2012 | Noda ................... | H01M 10/488 429/92 |
| 2012/0160529 A1* | 6/2012 | Eshleman ............... | B25B 21/00 173/1 |

(Continued)

FOREIGN PATENT DOCUMENTS

| | | |
|---|---|---|
| CN | 1783644 A | 6/2006 |
| CN | 1788940 A | 6/2006 |

(Continued)

OTHER PUBLICATIONS

Chinese Office Action dated Jan. 4, 2015 for corresponding Chinese Application No. 201310167284.9 and English translation.

(Continued)

*Primary Examiner* — Eduardo Colon Santana
*Assistant Examiner* — Gabriel Agared
(74) *Attorney, Agent, or Firm* — Renner, Otto, Boisselle & Sklar, LLP (57) ABSTRACT

A power tool includes a motor, a gear mechanism that changes the speed of an output of the motor, a drive circuit including a switching element that controls power supplied to the motor, a housing that accommodates the motor, a fixture that fixes the motor to the housing, and a temperature sensor that measures a temperature of the switching element. The drive circuit stops supplying power to the motor when the temperature measured by the temperature sensor reaches a predetermined temperature. The fixture functions to radiate heat from the switching element.

3 Claims, 6 Drawing Sheets

(56) References Cited

U.S. PATENT DOCUMENTS

| | | | |
|---|---|---|---|
| 2012/0230831 A1 | 9/2012 | Abe et al. | |
| 2012/0247796 A1* | 10/2012 | Mueller | B25F 5/00 173/1 |
| 2012/0258832 A1* | 10/2012 | Kondo | B25F 5/001 475/149 |

FOREIGN PATENT DOCUMENTS

| | | |
|---|---|---|
| CN | 2797321 Y | 7/2006 |
| CN | 101228010 A | 7/2008 |
| CN | 201353758 Y | 12/2009 |
| CN | 102686912 A | 9/2012 |
| JP | 60-207776 A | 10/1985 |
| JP | 09-131673 A | 5/1997 |
| JP | 10-271736 A | 10/1998 |
| JP | 2006-297532 A | 11/2006 |
| JP | 2007-268634 A | 10/2007 |
| JP | 2008-068353 A | 3/2008 |
| JP | 2010-214520 A | 9/2010 |
| JP | 2010-264534 A | 11/2010 |
| JP | 2011-005555 A | 1/2011 |
| JP | 2012-071363 A | 4/2012 |

OTHER PUBLICATIONS

European Search Report for corresponding European Application 13166164.7 dated Jul. 15, 2015.

Chinese Office Action for corresponding Chinese Application No. 201310167284.9 dated Aug. 25, 2015 and English translation.

Japanese Office Action for corresponding Japanese Application No. 2012-108540 dated Nov. 24, 2015.

* cited by examiner

POWER TOOL

CROSS-REFERENCE TO RELATED APPLICATIONS

This application is based upon and claims the benefit of priority from prior Japanese Patent Application No. 2012-108540, filed on May 10, 2012, the entire contents of which are incorporated herein by reference.

BACKGROUND OF THE INVENTION

The present invention relates to a power tool including a motor serving as a drive source for a bit.

Japanese Laid-Open Patent Publication Nos. 2010-214520 and 60-207776 each disclose a power tool that drives a bit with a motor serving as a drive source. Japanese Laid-Open Patent Publication No. 2010-214520 (paragraphs 0020, 0033, and 0054, and FIGS. 1 and 2) describes a power tool including a motor, a gear mechanism, switching elements of a motor drive circuit, and a temperature sensor. The gear mechanism shifts the speed of the rotation output from the motor and transmits the rotation output to a rotation output unit to which a bit is attached. The temperature sensor measures the temperature of the switching elements. When the temperature of the switching element measured by the temperature sensor becomes higher than a set temperature, the power tool restricts or stops the rotation produced by the motor. The motor includes an output shaft. A fan is coupled to the output shaft. In the motor, the fan is rotated to produce an air current that cools the switching elements. The switching elements are fixed to the same heat radiation member and mounted on a circuit substrate. Further, the switching elements and the circuit substrate are arranged on opposite sides of the motor.

Japanese Laid-Open Patent Publication No. 60-207776 (left column in page 1 (claim 2), lower left column in page 4, FIGS. 9 and 11) describes a power tool that measures the temperature of a switching element (triac) with a temperature sensor. The power tool controls the rotation speed of the motor and stops the motor based on the measured temperature. A bracket is used to couple the switching element to a stator of the motor. The temperature sensor is coupled to the switching element or the bracket.

In the power tool of Japanese Laid-Open Patent Publication No. 2010-214520, the air current produced by the fan flows from the switching elements to the motor. This cools the switching element and the motor. However, the heat radiation member is dedicated to the switching elements, and thus does not radiate heat from the motor. Further, in the power tool of Japanese Laid-Open Patent Publication No. 60-207776, the switching element is coupled to the stator by the bracket. Thus, the heat of the motor hinders cooling of the switching elements.

In this manner, in the power tools of Japanese Laid-Open Patent Publication Nos. 2010-214520 and 60-207776, the cooling effect differs between the switching elements and the motor. Thus, when stopping the supply of power to the motor upon detection of overheating in the switching element, the temperature of the motor may be less than or equal to the tolerable limit temperature or may already be greater than the tolerable limit temperature.

SUMMARY OF THE INVENTION

One aspect of the present invention provides a power tool including a motor, a gear mechanism that changes the speed of an output of the motor, a drive circuit including a switching element that controls power supplied to the motor, a housing that accommodates the motor, a fixture that fixes the motor to the housing, and a temperature sensor that measures a temperature of the switching element. The drive circuit stops supplying power to the motor when the temperature measured by the temperature sensor reaches a predetermined temperature. The fixture functions to radiate heat from the switching element.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

A power tool according to one embodiment of the present invention will now be described with reference to FIGS. 1 to 5.

Figure 1:
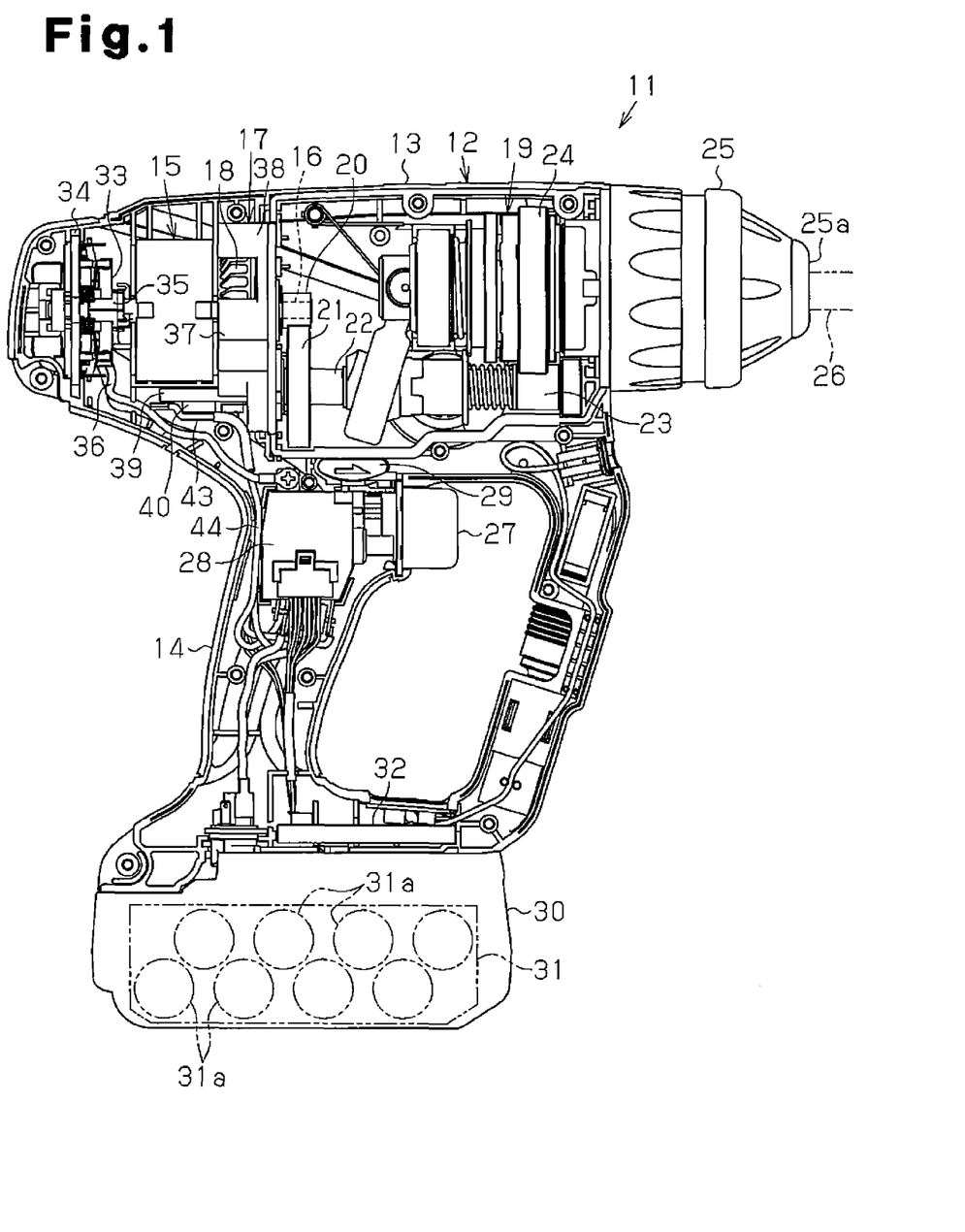
FIG. 1 is a cross-sectional side view of a power tool according to one embodiment of the present invention.

Referring to FIG. 1, a power tool 11 of the present embodiment is of a hand-held type and used as, for example, an electrical screwdriver for concrete. A main housing 12 forms a shell of the power tool 11. The main housing 12 includes a barrel 13 and a handle 14. The barrel 13 is cylindrical and has closed ends. The handle 14 extends in a direction intersecting the axis of the barrel 13 (downward as viewed in FIG. 1). The main housing 12 of the present embodiment is one example of a housing.

The barrel 13 includes a basal portion (left portion as viewed in FIG. 1) that accommodates a motor 15. The motor 15 is coaxial with the barrel 13 and includes an output shaft 16 extending toward a distal portion of the barrel 13. The motor 15 is, for example, a brush motor. A cooling fan unit 17 is arranged next to the output shaft 16 of the motor 15. The cooling fan unit 17 includes a cooling fan 18. The cooling fan 18 is one example of a fan coupled to the output shaft 16.

Rotation of the cooling fan 18 produces an air current directed toward the motor 15. A gear mechanism 19 (speed reduction mechanism) is arranged next to the cooling fan 18 opposite to the motor 15. The gear mechanism receives the output of the output shaft 16 and shifts (reduces) the rotation speed.

A gear 20 (pinion gear) is arranged on the output shaft 16 projecting from the end surface (right end surface in FIG. 1) of the cooling fan unit 17. The gear mechanism 19 includes a gear 21 engaged with the gear 20, a power transmission shaft 22 coaxially rotated with the gear 21, a gear 23 arranged on an end of the power transmission shaft 22, and a gear 24 engaged with the gear 23. The gear mechanism 19 shifts the speed of the rotation transmitted from the motor 15, and rotates a rotation output unit 25 with the shifted rotation speed. The rotation output unit 25 is coupled to a distal end (right end as viewed in FIG. 1) of the barrel 13. A chuck 25a is arranged on the distal end of the rotation output unit 25. A bit 26 is attached in a removable manner to the chuck 25a. The bit 26 rotates coaxially with the rotation output unit 25.

The handle 14 includes a trigger lever 27 (operation lever) operated by a user when driving the power tool 11. A trigger switch 28 is arranged in the handle 14 at a position corresponding to the trigger lever 27. The trigger switch 28 is switched between activated and deactivated states when the user operates the trigger lever 27. Further, the power tool 11 includes a selection lever 29 operated by the user when switching the rotation direction of the bit 26 between forward and reverse directions.

A box-shaped battery pack case 30 is coupled in a removable manner to the lower end of the handle 14. The battery pack case 30 accommodates a battery pack 31, which is a rechargeable battery. The battery pack 31 accommodates chargeable battery cells 31a. The power tool 11 is of a charged type, and the battery pack 31 is used as a drive power supply of the power tool 11.

Further, as shown in FIG. 1, a circuit board 32 is arranged in the handle 14 proximal to the lower end of the handle 14. The circuit board 32 controls the motor 15. The trigger switch 28 electrically connects the circuit board 32 to the motor 15.

Figure 2:
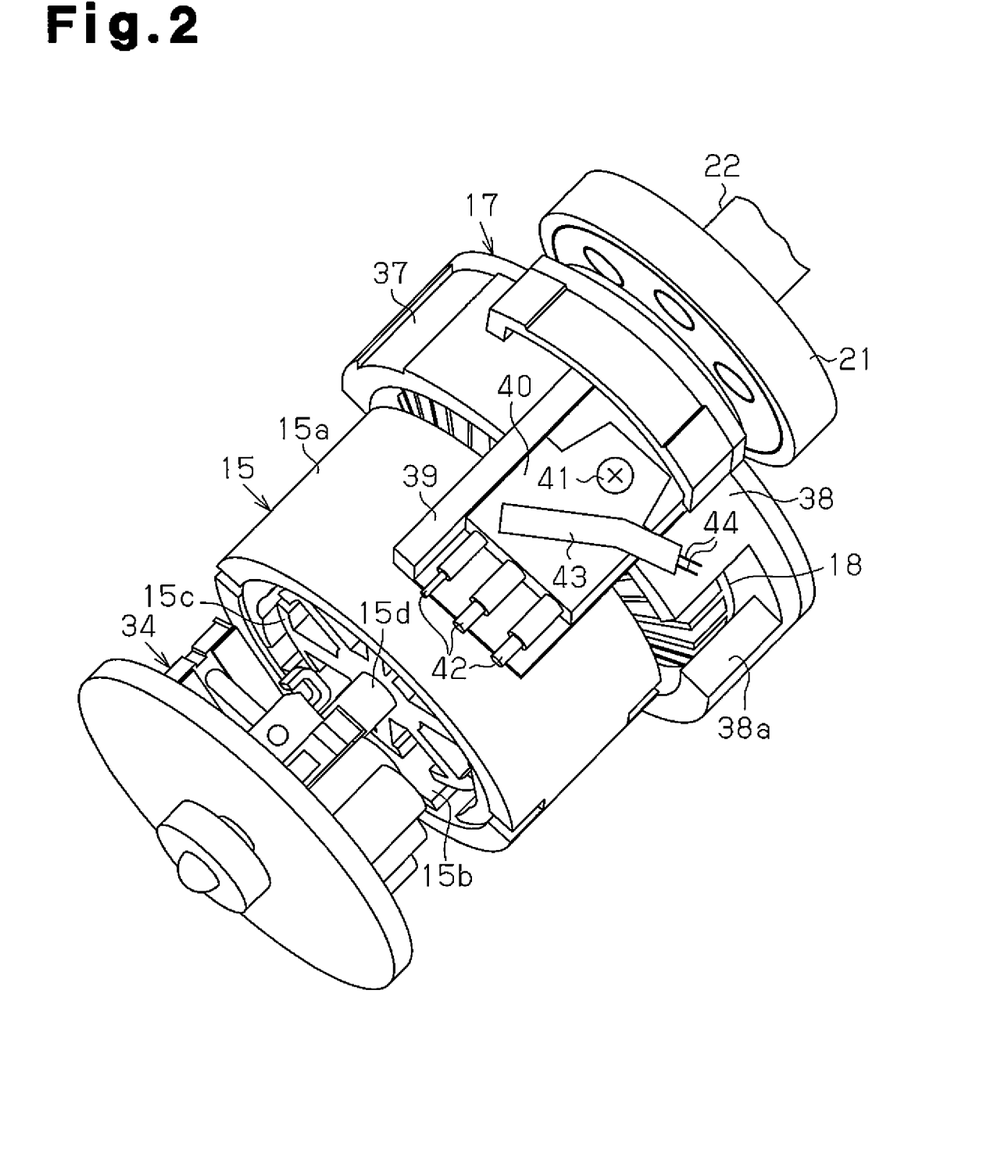
FIG. 2 is a perspective view showing a motor in the power tool of FIG. 1.
Figure 3:
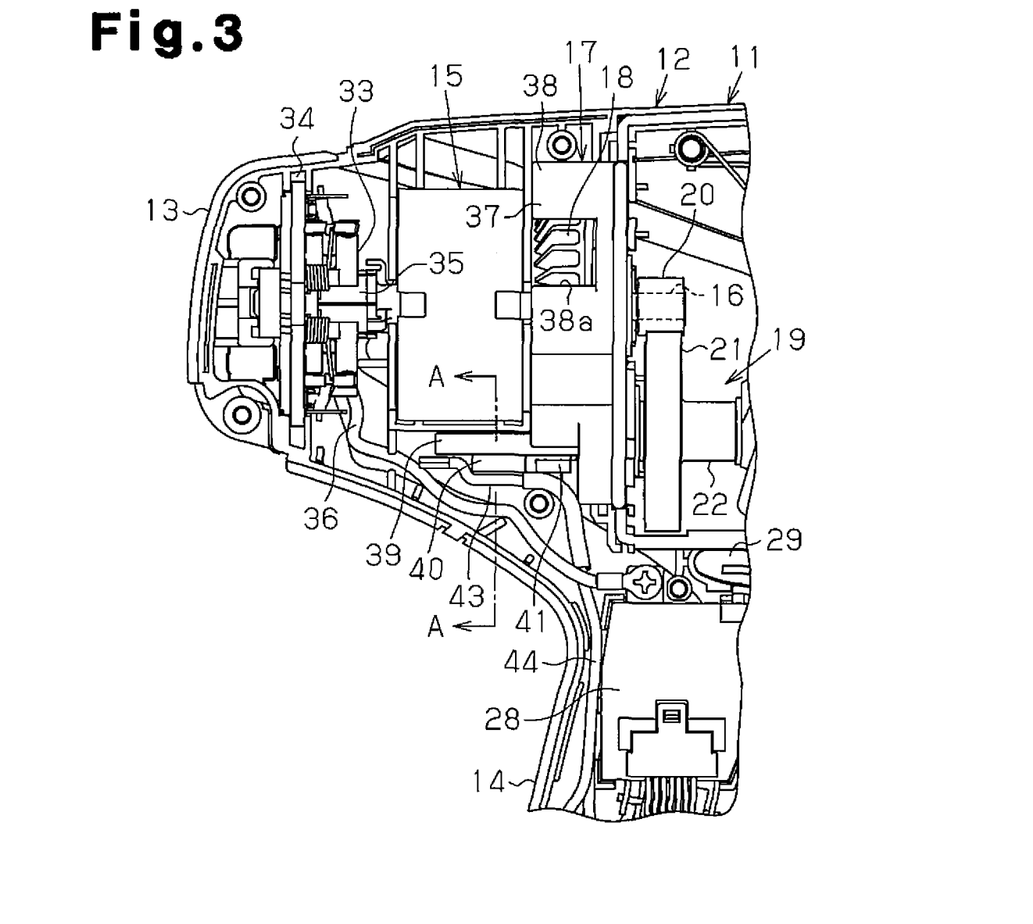
FIG. 3 is a cross-sectional partial view of the power tool of FIG. 1.

As shown in FIGS. 1 to 3, the motor 15 includes a cylindrical housing 15a that accommodates a stator 15b, a rotor 15c (refer to FIG. 2), and a rotational magnetic field generation coil (not shown). As described above, 35, the motor 15 is a brushless motor, and the power tool 11 includes a holder 34 that holds a brush 33 as shown in FIGS. 1 and 3. The brush 33 includes a distal portion held by the holder 34 to contact a commutator 35 fitted to the rear end (left end as viewed in FIG. 1) of the rotation shaft 15d (refer to FIG. 3). A lead wire 36 extending from the trigger switch 28 is electrically connected to the holder 34. Power is supplied from the battery pack 31 to the motor 15 by the trigger switch 28 and the lead wire 36. A portion of the rotation shaft 15d projecting from the motor 15 is the output shaft 16.

The output side of the motor 15 is fixed to the main housing 12 by a metal fixture 37. The fixture 37 is cylindrical and has closed ends. A shaft hole (now shown) extends through central portions of the closed ends. In detail, a bearing (not shown) arranged in the shaft hole of the fixture 37 supports the output shaft 16 of the motor 15. Screws (not shown) fasten and fix the fixture 37 in the barrel 13 of the main housing 12 at a predetermined location. The output shaft 16 is extended through the fixture 37 and coupled to the gear mechanism 19.

The cooling fan unit 17 shown in FIGS. 1 to 3 rotates the cooling fan 18 when the motor 15 is driven to produce an air current directed toward the motor 15. The cooling current cools the components of the motor 15 such as the coil and the brush 33. The fixture 37 also functions as a fan housing that accommodates the cooling fan 18. In detail, the fixture 37 of the cooling fan unit 17 includes a motor holding member 38 and a heat radiation plate 39. The motor holding member 38, which is cylindrical and has closed ends, functions as a fan housing that accommodates the cooling fan 18. The heat radiation plate 39 includes a basal portion fixed to the circumferential surface of the motor holding member 38 at one location. Further, the heat radiation plate 39 is tetragonal and extends parallel to the axis of the motor 15 in the downstream direction of the air current produced by the cooling fan 18. A screw (not shown) may be fastened to the basal portion of the heat radiation plate 39 to fix the heat radiation plate 39 to the circumferential surface of the motor holding member 38. Instead, the heat radiation plate 39 may be formed integrally with the motor holding member 38. In the present embodiment, the heat radiation plate 39 is one example of a fixing member.

Openings 38a are formed in the circumferential surface of the motor holding member 38 along the circumferential direction. The openings 38a function as inlets for drawing air into the fixture 37 during rotation of the cooling fan 18. The motor holding member 38 has the form of a cylindrical housing that has closed ends and generally covers the cooling fan 18. Thus, the motor holding member 38 functions to prevent defects of the cooling fan unit 17 and the motor 15 that would be caused by dust drawn in from the exterior by the cooling fan 18.

As shown in FIGS. 1 to 3, the heat radiation plate 39 extends along the circumferential surface of the motor 15 from the motor holding member 38. The heat radiation plate 39 is spaced apart from the circumferential surface of the motor 15 by a predetermined gap forming a flow passage for the air current from the cooling fan 18. A switching element 40 is coupled to the surface (outer surface) of the heat radiation plate 39 facing away from the motor 15. The switching element 40 adjusts the power supplied to the motor 15. In the present embodiment, the switching element 40 is a generally tetragonal plate-like component such as a field effect transistor (FET).

As shown in FIGS. 2 and 3, the heat radiation plate 39 is longer and wider than the switching element 40. The switching element 40 is coupled to the heat radiation plate 39 so that a coupling surface of the switching element 40 is entirely in contact with an outer surface of the heat radiation plate 39. In this example, a screw 41 is inserted into an insertion hole formed in one end of the switching element 40 and fastened to a threaded hole (not shown) formed in the heat radiation plate 39 to fix the switching element 40 to the heat radiation plate 39.

The fixture 37 of the present embodiment is formed from a material having a superior heat radiation property and allowing for easy radiation of heat from the switching element 40 to the exterior. The material of the fixture 37 may be a metal such as aluminum, steel, copper, aluminum allow, steel alloy (e.g., stainless steel), or copper alloy. The motor holding member 38 and the heat radiation plate 39, which form the fixture 37, may be formed from the same material or different materials as long as the heat radiation property is superior.

Referring to FIG. 2, three lead wires 42 are respectively connected to three terminals (not shown) of the switching element 40. The three lead wires 42 are extended through the handle 14 and electrically connected to the circuit board 32 (not shown). The circuit board 32 controls the supply of power to the motor 15 through the switching element 40 thereby controlling the rotation and torque of the motor 15.

As shown in FIGS. 2 and 3, a temperature sensor 43 (e.g., thermistor) is coupled to the switching element 40 on the surface opposite to the surface coupled to the heat radiation plate 39. A lead wire 44 electrically connects the temperature sensor 43 to the circuit board 32 (refer to FIG. 1). The temperature sensor 43 measures (detects) the temperature of the switching element 40, which is fixed to the heat radiation plate 39. The measured temperature Td allows for estimation of the temperature when the motor 15 is outputting high torque. The circuit board 32 receives the measured temperature Td from the temperature sensor 43. When the measured temperature Td reaches a predetermined threshold temperature Ts that indicates overload (overheating) of the motor 15, the circuit board 32 deactivates the switching element 40 and stops supplying power to the motor 15.

Figure 4:
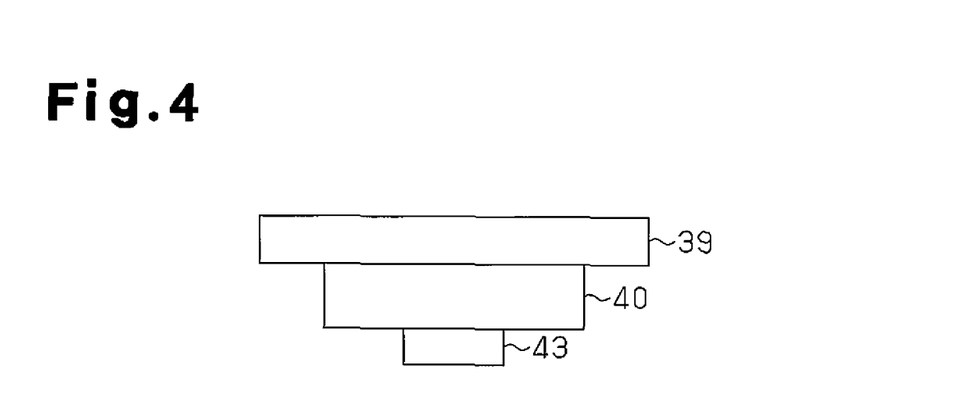
FIG. 4 is a schematic cross-sectional view taken along line A-A in FIG. 3 showing a structure for coupling a switching element and a temperature sensor to a heat radiation plate.

FIG. 4 is a schematic cross-sectional view taken along line A-A in FIG. 3 and shows the structure for coupling the heat radiation plate 39, the switching element 40, and the temperature sensor 43. As shown in FIG. 4, the switching element 40 is coupled to the heat radiation plate 39 with the coupling surface of the switching element 40 in contact with the outer surface (lower surface as viewed in FIG. 4) of the heat radiation plate 39. Further, the temperature sensor 43 is coupled to the switching element 40 with the coupling surface of the temperature sensor 43 in contact with the surface of the switching element 40 opposite to the coupling surface. The heat of the switching element 40 is transferred to the heat radiation plate 39. This effectively cools the switching element 40.

When the motor 15 is supplied with power, the amount of current flowing to the switching element 40 is the same as the amount of current flowing to the motor 15, and the switching element 40 has the same heating tendency as the motor 15. The switching element 40 is coupled to the fixture 37, which is cooled by the cooling current produced by the cooling fan 18, together with the motor 15. In this manner, the switching element 40 and the motor 15 share the fixture 37 that functions to radiate heat. Thus, the accumulated heat of the motor 15 and the accumulated heat of the switching element 40 have a relatively strong positive correlation. This allows for the supply of power to be properly stopped when the motor 15 is in an overload state (overheated) even if the supply of power to the motor 15 is stopped based on the measured temperature Td of the switching element 40.

The electrical configuration of the power tool 11 will now be described with reference to FIG. 5.

The power tool 11 includes a control circuit 45 that controls the rotation and torque of the motor 15. The control circuit 45 is arranged on the circuit board 32 (refer to FIG. 1).

A battery B formed by the battery pack 31 includes a positive terminal connected in series to the trigger switch 28. When the trigger lever 27 is operated, the trigger switch 28 is activated (closed). This provides the control circuit 45 with an activation signal (operation signal). When stopping the operation of the trigger lever 27, the trigger switch 28 is deactivated (opened). This provides the control circuit 45 with a deactivation signal (operation stop signal).

Figure 5:
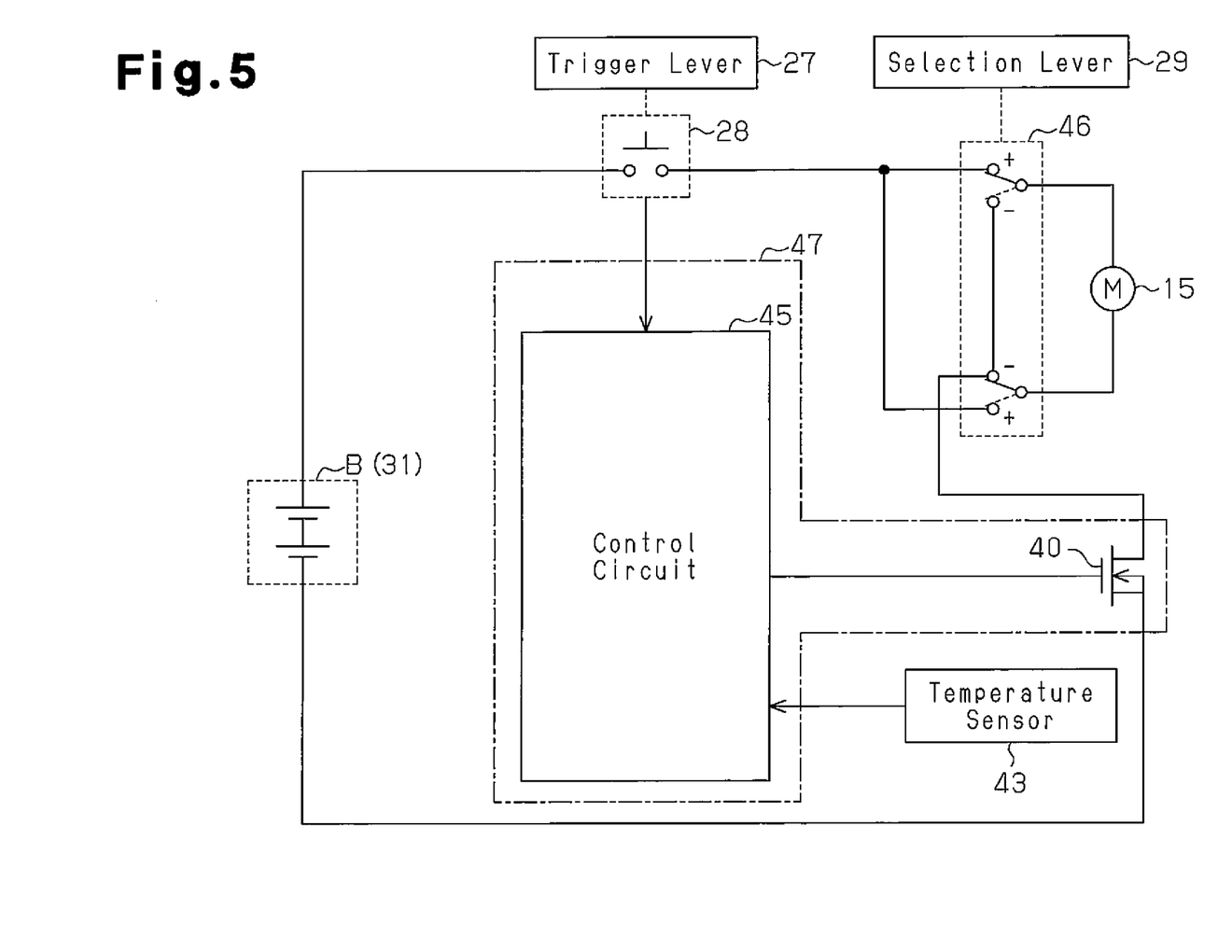
FIG. 5 is an electric circuit diagram of the power tool of FIG. 1.

Further, as shown in FIG. 5, a selection switch 46 is connected in series to the trigger switch 28 and connected parallel to the motor 15. The selection switch 46 is formed by a set of two switches, one including a positive terminal connected to the trigger lever 27, and another including a negative terminal connected to the drain terminal of the switching element 40. The two switches are switched so that one is connected to a positive terminal and the other one is connected to a negative terminal. When the selection lever 29 is arranged at a forward rotation selection position, the selection switch 46 is switched to a forward rotation connection shown by the solid lines in FIG. 5. This applies voltage to the motor 15 that produces forward rotation. When the selection lever 29 is arranged at a reverse forward selection position, the selection switch 46 is switched to a reverse rotation connection shown by the broken lines in FIG. 5. This applies voltage to the motor 15 that produces reverse rotation.

The source terminal of the switching element 40 is connected to the negative terminal of the battery B. Further, the gate terminal of the switching element 40 is connected to the control circuit 45. When the control circuit 45 receives an operation signal from the trigger switch 28, the control circuit 45 provides the gate terminal of the switching element 40 with a motor control signal (gate on/off signal) that controls the operation of the motor 15. The switching element 40 is activated and deactivate in response to the motor control signal. Based on the activation and deactivation of the switching element 40, DC voltage is supplied from the battery B to the motor 15.

In detail, the control circuit 45 activates the switching element 40 to drive and produce rotation with the motor 15 at maximum output, and deactivates the switching element 40 to stop the rotation of the motor 15. Further, the control circuit 45 performs pulse width modulation (PWM) to drive the switching element 40 and control the rotation speed of the motor 15. When applying a large torque to the bit 26, the control circuit 45 uses a known control system (not shown in FIG. 5) to automatically raise the duty ratio of the switching element 40 and increase the current supplied to the motor 15. In the present embodiment, a drive circuit 47 including the control circuit 45 (circuit board 32) and the switching element 40 is one example of a drive circuit including a switching element.

In the power tool 11 including the circuit shown in FIG. 5, the user attaches the desired bit 26 to the chuck 25a and grasps the handle 14. Then, the user selects the forward or reverse rotation direction for the bit 26 with the selection lever 29. Operation of the trigger lever 27 drives the motor 15 and rotates the bit 26, attached to the rotation output unit 25, with a certain torque.

The same amount of current flows to the switching element 40 and the motor 15. This heats the switching element 40. Thus, the temperature Td measured by the temperature sensor 43 allows for presumption of when the motor 15 reaches an overload state. When the measured temperature Td reaches the threshold temperature Ts, which is one example of a predetermined temperature, the control circuit 45 determines (presumes) that the motor 15 is in an overload state, and deactivates the switching element 40. Deactivation of the switching element 40 stops supplying power to the motor 15 and forcibly stops the driving of the motor 15 even when the trigger lever 27 is operated and the trigger switch 28 is activated.

The operation of the power tool 11 will now be described.

Operation of the trigger lever 27 drives the power tool 11 and rotates the bit 26 to perform a task with the bit 26. When the bit 26 is a driver bit, a concrete screw is fastened to concrete with the driver. When the bit 26 is a drill bit, a hole is bored into concrete with the drill.

When the trigger lever 27 is operated, the gear mechanism 19 shifts the rotation speed of the output shaft 16 of the motor 15 and rotates the rotation output unit 25 at the shifted rotation speed. This rotates the bit 26 attached to the chuck 25a. Here, the motor 15 produces forward rotation or reverse rotation in accordance with the connection of the selection switch 46 that corresponds to the selection position of the selection lever 29.

When the power tool 11 is driven, the rotation of the motor 15 rotates the cooling fan 18 and draws air through the openings 38a of the motor holding member 38. The drawn in air forms an air current directed toward the motor 15 to cool the motor 15, the brush 33, and the like. Under this situation, the fixture 37 is cooled by the air that flows near the circumferential surface of the motor holding member 38 and enters the openings 38*a*, the air that flows through the interior of the motor holding member 38, and the air that flows from the cooling fan 18 toward the motor 15 via the heat radiation plate 39.

Further, when the current flowing through the coil heats the motor 15, the same amount of current flows to the switching element 40. Thus, the switching element 40 is heated in the same manner as the motor 15. Since the switching element 40 is fixed to the heat radiation plate 39 of the fixture that is cooled by an air current, heat is transferred from the switching element 40 to the fixture 37. This effectively cools the switching element 40. Further, heat is transferred from the motor 15 to the air current flowing from the cooling fan 18 toward the motor 15. The heat is also transferred from the output shaft 16 of the motor 15 to the fixture 37.

The heat radiation plate 39 is spaced apart from the circumferential surface of the motor 15 by a gap. The gap forms a flow passage for air current that exchanges heat with the heat radiation plate 39 and thereby cools the heat radiation plate 39. This further efficiently transfers heat from the switching element 40 to the heat radiation plate 39 and further improves the cooling effect of the switching element 40. Further, since the heat radiation plate 39 is spaced apart by the gap from the circumferential surface of the motor 15, the heat radiation plate 39 receives radiation heat from the motor 15 and thereby exchanges heat with the motor 15. In this manner, the heat radiation plate 39 serves as a heat radiation member shared by the motor 15 and the switching element 40. Thus, the accumulated heat of the switching element 40 and the accumulated heat of the motor 15 have a relatively strong positive correlation.

When the power tool 11 is driven, the temperature sensor 43 measures the temperature of the switching element 40. The control circuit 45 determines whether or not the measured temperature Td has reached the threshold temperature Ts (Td Ts). When determining that the measured temperature Td has reached the threshold temperature Ts, the control circuit 45 deactivates the switching element 40 and stops the supply of power to the motor 15. This suppresses defects that would be caused by overheating such as a shortened life. Further, a situation is avoided in which the temperature of the motor 15 is significantly lower than the tolerable limit temperature or significantly higher than the tolerable limit temperature when the measured temperature Td reaches the threshold temperature Ts and the control circuit 45 stops the supply of power to the motor 15.

The advantages of the present embodiment will now be described.

(1) The switching element 40 is coupled to the metal fixture 37, which fixes the motor 15 to the main housing 12. As a result, the fixture 37 functions to radiate heat from the switching element 40. Accordingly, the fixture 37 functions to radiate heat from both of the motor 15 and the switching element 40. Thus, the accumulated heat of the motor 15 and the accumulated heat of the switching element 40 have a relatively strong positive correlation. This allows for the supply of power to be properly stopped when the motor 15 is overheated even if the supply of power to the motor 15 is stopped based on the measured temperature Td of the switching element 40. Further, the switching element 40 is efficiently cooled.

(2) The fixture 37 fixes the output side of the motor 15 to the main housing 12, and includes the motor holding member 38, which holds motor 15, and the heat radiation plate 39, which extends from the motor holding member 38. The switching element 40 is coupled to the heat radiation plate 39. Due to peripheral components or the shape of the switching element 40, it may be difficult to provide a surface where the motor holding member 38 may be coupled to in the motor holding member 38. However, by extending the heat radiation plate 39 from the motor holding member 38, space for coupling the switching element 40 may be obtained. Further, the heat radiation plate 39 has a shape and size that allows for the entire surface of the switching element 40 to be in contact with the heat radiation plate 39. Thus, most of the coupling surface of the switching element 40 may be in contact with the heat radiation plate 39, and a large heat transmission area may be obtained from the switching element 40 to the heat radiation plate 39. Further, the heat radiation plate 39 extends in a manner projecting from the motor holding member 38. Thus, the projecting form obtains a relatively wide surface area for the heat radiation plate 39. This also increases the cooling effect of the switching element 40.

(3) The cooling fan 18 (fan unit), which is coupled to the output shaft 16 of the motor 15, produces an air current that cools the motor holding member 38 and cools the switching element 40 with the heat radiation plate 39 extending from the motor holding member 38.

(4) The heat radiation plate 39 extends from the motor holding member 38, which functions as a fan housing for the cooling fan 18, in the downstream direction of the air current produced by the cooling fan 18. This further improves the effect for cooling the switching element 40 on the heat radiation plate 39.

(5) The heat radiation plate 39 is spaced apart by a gap, which forms a flow passage for the air current from the cooling fan 18, from the circumferential surface of the motor 15, and extends along the circumferential surface of the motor 15. The switching element 40 is coupled to the heat radiation plate 39 on the surface facing away from the motor 15. Thus, the heat radiation plate 39 functions to radiate heat from both of the motor 15 and the switching element 40. Accordingly, when the temperature of the motor 15 is high and the heat radiation plate 39 is hot, the heat radiation efficiency of both of the motor 15 and the switching element 40 decreases. When the temperature of the heat radiation plate 39 is low, heat from both of the motor 15 and the switching element 40 are both efficiently transferred to the heat radiation plate 39. Thus, the temperature of the motor 15 and the temperature of the switching element 40 have an even stronger positive correlation. This allows for the supply of power to be further properly stopped when the motor 15 is overheated even if the supply of power to the motor 15 is stopped based on the measured temperature Td of the switching element 40.

(6) The temperature sensor 43 is coupled to the surface of the heat radiation plate 39 opposite to the surface to which the switching element 40 is coupled. This obtains a large area of contact between the temperature sensor 43 and the switching element 40, and heat from the switching element 40 is efficiently transmitted to the temperature sensor 43. This improves the sensitivity of the temperature sensor 43.

It should be apparent to those skilled in the art that the present invention may be embodied in many other specific forms without departing from the spirit or scope of the invention. Particularly, it should be understood that the present invention may be embodied in the following forms.

Figure 6:
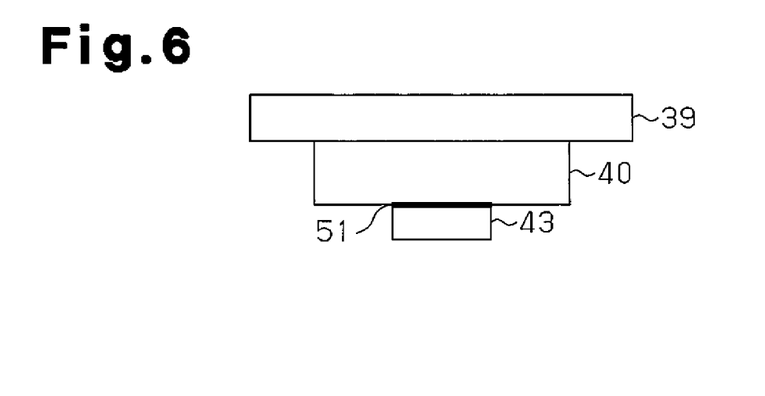
FIG. 6 is a schematic cross-sectional view showing a coupling structure for a temperature sensor in a modification.

In the above embodiment, as shown in FIG. 6, grease 51 may be applied between the switching element 40 and the temperature sensor 43. The grease 51 is formed from a material having high heat conductivity. This improves the sensitivity of the temperature sensor 43 and allows for the temperature to be measured with high responsivity.

Figure 7:
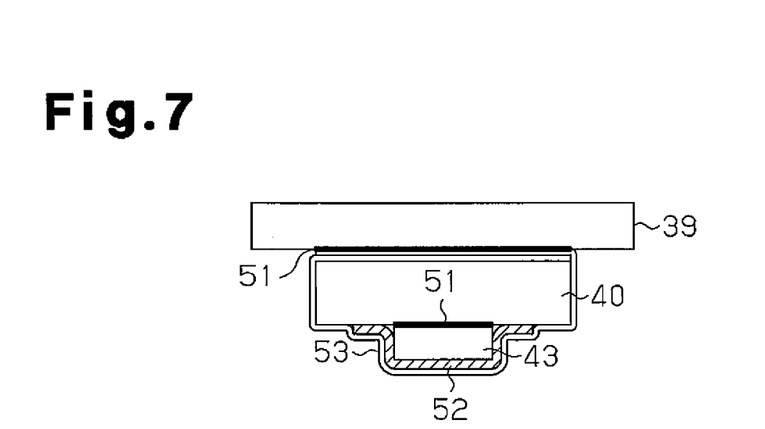
FIG. 7 is a schematic cross-sectional view showing a coupling structure for a temperature sensor in a modification that differs from FIG. 6.

The structure of the above embodiment may be changed to the structure shown in FIG. 7. In this case, grease 51, formed from a material having high conductivity, is applied between the switching element 40 and the temperature sensor 43. A heat-resistant tape 52 covers the temperature sensor 43. A metal foil tape 53 entirely covers the temperature sensor 43 and the switching element 40 from the outer side of the heat-resistant tape 52. Grease 51, which is formed from a material having high conductivity, is applied between the metal foil tape 53 and the heat radiation plate 39. Further, the temperature sensor 43 and the switching element 40, which are covered by the metal foil tape 53, are coupled to the outer surface of the heat radiation plate 39. In this structure, the temperature sensor 43 is fixed to the switching element 40 with the metal foil tape 53, and there is no need for screws and tools. Thus, the task for coupling the temperature sensor 43 is relatively simple. Further, the application of the metal foil tape 53 allows for the switching element 40 and the temperature sensor 43 to be held in contact, and heat is transmitted from the switching element 40 to the temperature sensor 43 through the metal foil tape 53 in addition to the contacting surfaces. This further improves the sensitivity of the temperature sensor 43, and allows for the temperature to be measured with higher responsivity. Further, heat from the switching element 40 may be transmitted by the metal foil tape 53 to the surfaces of contact between the switching element 40 and the heat radiation plate 39. Moreover, the grease 51 is applied to the surface contacting the heat radiation plate 39 (fixture 37). This increases the effect for cooling the switching element 40.

The metal foil tape 53 may be, for example, an aluminum tape, a copper tape, or a stainless tape. Further, there is no limitation to a metal foil tape. Any flexible member having superior heat conductivity, such as a metal sheet, may be used in lieu of the metal foil tape 53. Further, the flexible member does not have to be formed from metal. As long as superior heat conductivity may be obtained, the flexible member may be formed from a resin having high heat conductivity or a composite of resin and another substance. The composite may be a resin containing metal powder or ceramic powder. Another example of the composite is a laminated body, such as a laminated film, of metal and resin. In such cases, heat is effectively transmitted from the switching element 40 to the temperature sensor 43. Further, the sensitivity of the temperature sensor 43 is improved, and the temperature may be detected with high responsivity. An insulative tape may be used as the heat-resistant tape 52.

Figure 8:
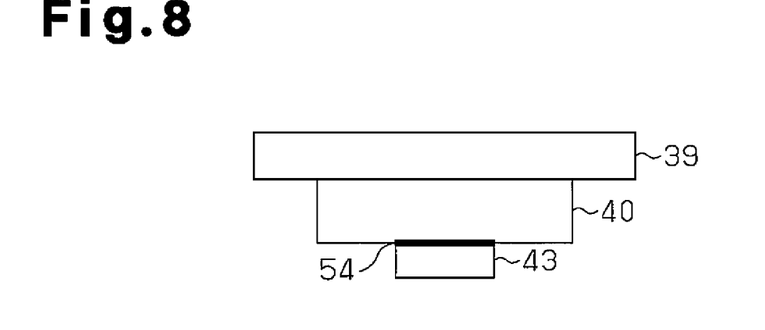
FIG. 8 is a schematic cross-sectional view showing a coupling structure for a temperature sensor in a modification that differs from FIG. 7.

In the above embodiment, as shown in FIG. 8, an adhesive agent 54 may be used to fix the temperature sensor 43 and the switching element 40 to each other. In this case, it is preferable that the adhesive agent 54 be formed from a material having elasticity and high thermal conductivity. This structure prevents separation of the temperature sensor 43 that may be caused by the impact load and vibration produced when using the power tool 11, and improves the sensitivity of the temperature sensor 43. Further, when fastening the temperature sensor 43 with screws, vibration of the power tool 11 may loosen the screws. This may form a gap that lowers the sensitivity of the temperature sensor 43. However, when fastening the temperature sensor 43 with the adhesive agent 54, such a problem does not occur.

Figure 9:
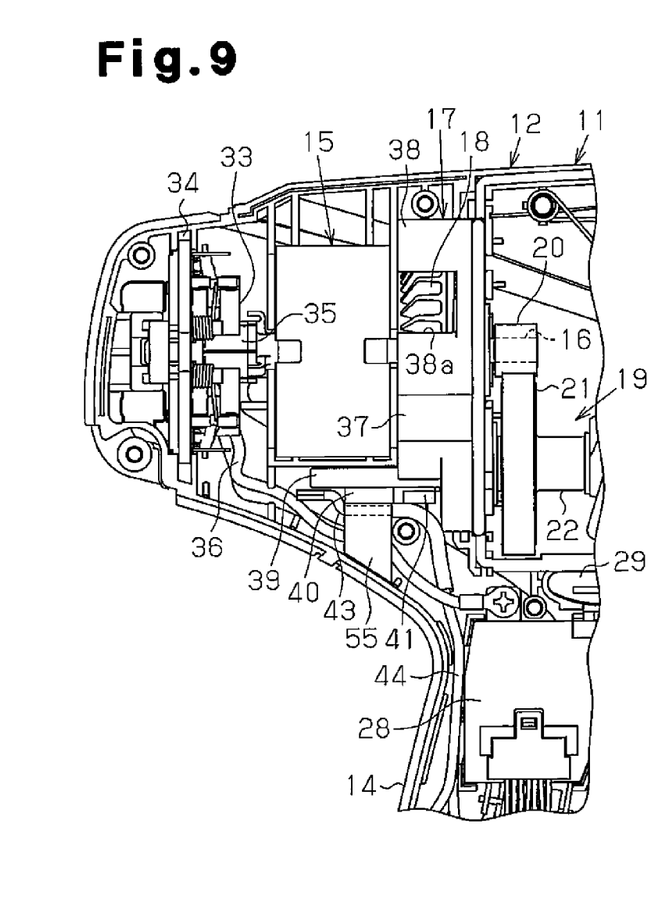
FIG. 9 is a schematic cross-sectional view showing a coupling structure for a temperature sensor in a modification that differs from FIG. 8.

As shown in FIG. 9, an elastic body 55 may be added to push the temperature sensor 43 toward the switching element 40. This structure increases the holding strength of the temperature sensor 43 and the switching element 40. Further, the elastic body 55 applies pressure that keeps the temperature sensor 43 in contact with the switching element. Since the temperature sensor 43 is not separated from the switching element 40, the temperature of the switching element 40 may be measured without a decrease in the sensitivity of the temperature sensor. Further, even when the power tool 11 vibrates greatly, the temperature sensor 43 is not separated from the switching element 40.

Figure 10:
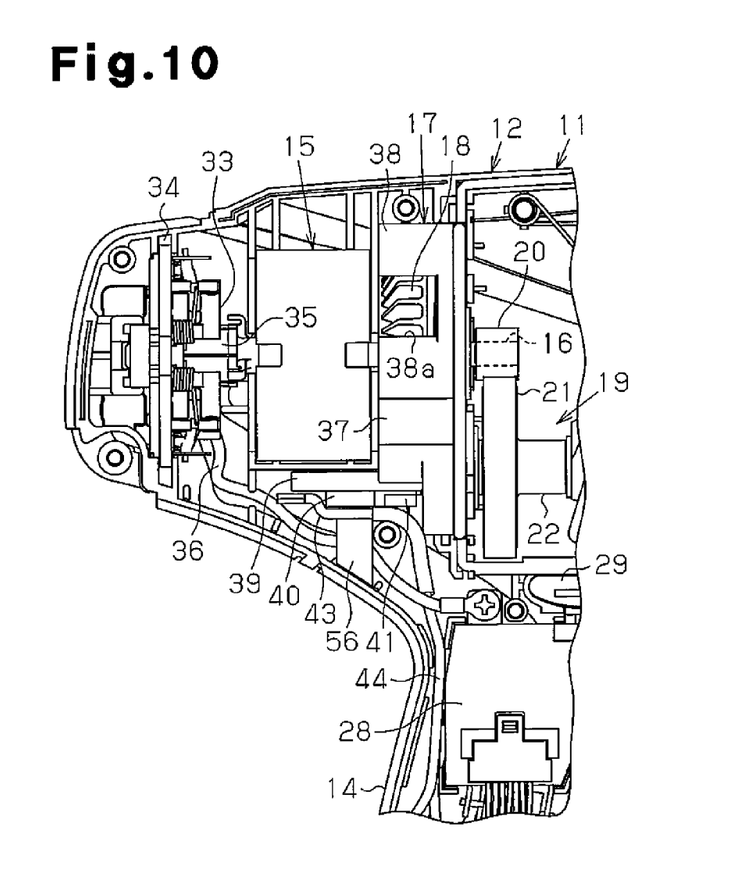
FIG. 10 is a schematic cross-sectional view showing a coupling structure for a temperature sensor in a modification that differs from FIG. 9.

As shown in FIG. 10, a rib 56 may be arranged in contact with the temperature sensor 43. The rib 56 forces the temperature sensor 43 toward the switching element 40. This prevents separation of the temperature sensor 43 from the switching element 40.

The motor is not limited to a brush motor and may be a brushless motor. When using a brushless motor, a switching element in a drive circuit of the motor is coupled to a fixture that fixes the motor to the housing, and a temperature sensor is arranged on the switching element. This obtains the same advantages as a brush motor.

In the above embodiment, when a motor does not include the cooling fan 18, a switching element is coupled to a fixture for fixing the motor 15 to the main housing 12. A temperature sensor measures the temperature of the switching element.

A switching element may be arranged on the front end surface (right end surface as viewed in FIG. 3) of the fixture 37, which is located at the output side of the motor 15, or on a circumferential surface of the fixture 37. Further, a fixture for fixing a motor to a main housing may be arranged on the rear side (side opposite to output side) of the motor, and the switching element 40 may be coupled to the fixture.

The power tool may be of a chargeable type. The power tool may also be of a non-chargeable type that is supplied with AC power.

In the above embodiment, an electrical screwdriver for concrete is used as the power tool. However, there is no limitation to an electrical screw driver, and the present invention may be applied to any power tool that uses a motor as a drive source. For example, the present invention may be applied to an impact driver, a hammer drill, an impact wrench, a circular saw, a jigsaw, a screwdriver, a vibration driver, a grinder, a nail gun, and the like. In this case, the power tool is not limited to use for concrete, and the material of the subject of the power tool may be wood, plastic, metal, ceramics, and the like.

The present examples and embodiments are to be considered as illustrative and not restrictive, and the invention is not to be limited to the details given herein, but may be modified within the scope and equivalence of the appended claims.

The invention claimed is:

1. A power tool comprising:
a motor;
a gear mechanism that changes the speed of an output of the motor;
a drive circuit including a switching element that controls power supplied to the motor;
a housing that accommodates the motor;
a fixture that fixes the motor to the housing, wherein the fixture is arranged on an output shaft of the motor that projects toward the gear mechanism side of the motor; and
a temperature sensor that measures a temperature of the switching element, wherein
the drive circuit stops supplying power to the motor when the temperature measured by the temperature sensor reaches a predetermined temperature,
the switching element is coupled to the fixture, and
the fixture functions to radiate heat from the switching element, wherein the fixture includes
a motor holding member that holds the motor, and
a heat radiation plate that extends from the motor holding member and holds the switching member,
the power tool further comprising a fan unit arranged on an output shaft of the motor, wherein the fan unit produces an air current that cools the motor holding member, and the air current further flows by the heat radiation plate extending from the motor holding member and cools the switching element,
wherein the heat radiation plate is spaced apart from a circumferential surface of the motor by a gap that forms a flow passage for the air current, and the heat radiation plate is located radially outward from the circumferential surface and extended along the circumferential surface, and
wherein the heat radiation plate is tetragonal and extends parallel to the axis of the motor in the downstream direction of the air current produced by the cooling fan.

2. The power tool according to claim 1, wherein
the motor holding member functions as a fan housing that covers the fan unit; and
the heat radiation plate extends from the motor holding member in a downstream direction of the air current produced by the fan unit.

3. The power tool according to claim 1, wherein
the heat radiation plate includes a first surface facing toward the circumferential surface of the motor and a second surface facing away from circumferential surface of the motor, and
the switching element is arranged on the second surface.

* * * * *